US008366289B2

(12) United States Patent
Zaksenberg

(10) Patent No.: US 8,366,289 B2
(45) Date of Patent: Feb. 5, 2013

(54) LIGHT APPARATUS WITH ATTACHMENT MEANS

(76) Inventor: Issac Zaksenberg, Scotch Plains, NJ (US)

(*) Notice: Subject to any disclaimer, the term of this patent is extended or adjusted under 35 U.S.C. 154(b) by 340 days.

(21) Appl. No.: 12/849,847

(22) Filed: Aug. 4, 2010

(65) Prior Publication Data

US 2011/0044031 A1 Feb. 24, 2011

Related U.S. Application Data

(60) Provisional application No. 61/235,376, filed on Aug. 20, 2009.

(51) Int. Cl.
*F21L 4/00* (2006.01)
*H04M 1/22* (2006.01)

(52) U.S. Cl. ......................... 362/191; 362/157; 362/190

(58) Field of Classification Search ........................ None
See application file for complete search history.

(56) References Cited

U.S. PATENT DOCUMENTS

| | | | | |
|---|---|---|---|---|
| 4,628,418 A * | 12/1986 | Chabria | ........................ | 362/116 |
| 2009/0251888 A1 * | 10/2009 | Douglas | ........................ | 362/103 |

* cited by examiner

*Primary Examiner* — Natalie Walford
(74) *Attorney, Agent, or Firm* — Jennifer Meredith, Esq.; Meredith & Keyhani, PLLC

(57) ABSTRACT

A personal light apparatus, the apparatus comprising: a resting base having a flat portion and a battery compartment for receiving a battery; a light having a flexible tube, the flexible tube attached to the resting base; a switch in electrical communication with the battery and the light, wherein the switch turns on and off the light; and at least one attachment means for removably attaching a time keeping apparatus to the flat portion.

20 Claims, 10 Drawing Sheets

SECTION A-A

LIGHT APPARATUS WITH ATTACHMENT MEANS

CROSS-REFERENCE TO RELATED APPLICATIONS

The present application claims priority to and the benefit of U.S. Provisional Patent Application No. 61/235,376, filed at the U.S. Patent and Trademark Office on Aug. 20, 2009, the entire contents are incorporated by this reference.

FIELD OF THE INVENTION

The present invention pertains generally to time keeping and light devices, and more specifically a lighting apparatus that may be retained by a time keeping apparatus to illuminate the time keeping apparatus or used to illuminate any area desired by the wearer.

DESCRIPTION OF RELATED ART

Many watches have lights contained under the glass of the watch, to illuminate the watch in the evening. However, the light is not capable of providing light to the wearer in other directed areas. The present invention overcomes this by providing a light attached to a flexible tube, so that the wearer may direct the light to any chosen place.

These and other features aspects and advantages of the present invention will become better understood with reference to the following description and claims.

SUMMARY OF THE INVENTION

Aspects of the present invention provide a personal light apparatus, the apparatus comprising: a resting base having a flat portion and a battery compartment for receiving a battery; a light having a flexible tube, the flexible tube attached to the resting base; a switch in electrical communication with the battery and the light, wherein the switch turns on and off the light; and at least one attachment means for removably attaching a time keeping apparatus to the flat portion.

According to another aspect of the present invention, a personal light apparatus is provided, the apparatus comprising: a resting base having a flat portion and a battery compartment for receiving a battery; a light having a flexible tube, the flexible tube attached to the resting base; a switch in electrical communication with the battery and the light, wherein the switch turns on and off the light; at least one hinged elbow; at least one flexible arm in communication with the hinged elbow, wherein at least one flexible arm is an outer flexible arm; and at least one retaining bracket in communication with the outer flexible arm for removably attaching and retaining different sized time keeping apparatus to the flat portion.

These and other features, aspects and advantages of the present invention will become better understood with reference to the following description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a light that is attached to a watchband or a watch base of a time keeping apparatus. The term time keeping apparatus is intended to include any watch, timepiece or time keeping device. It is preferred that it is a light attached to a flexible arm to allow for the light to be put away or utilized when needed. This is a LED Flashlight that is always with you. Since you wear it with your wrist watch, you never need to look for a flashlight. You can direct the beam of light where you need it, with the flexible gooseneck. You can store the light when it is not in use. The unit has a flexible spring that will adjust in size to fit the diameter of 95% of all round watches. It is easy and simple to attach to your watch. It has an easy to operate switch.

Figure 11:
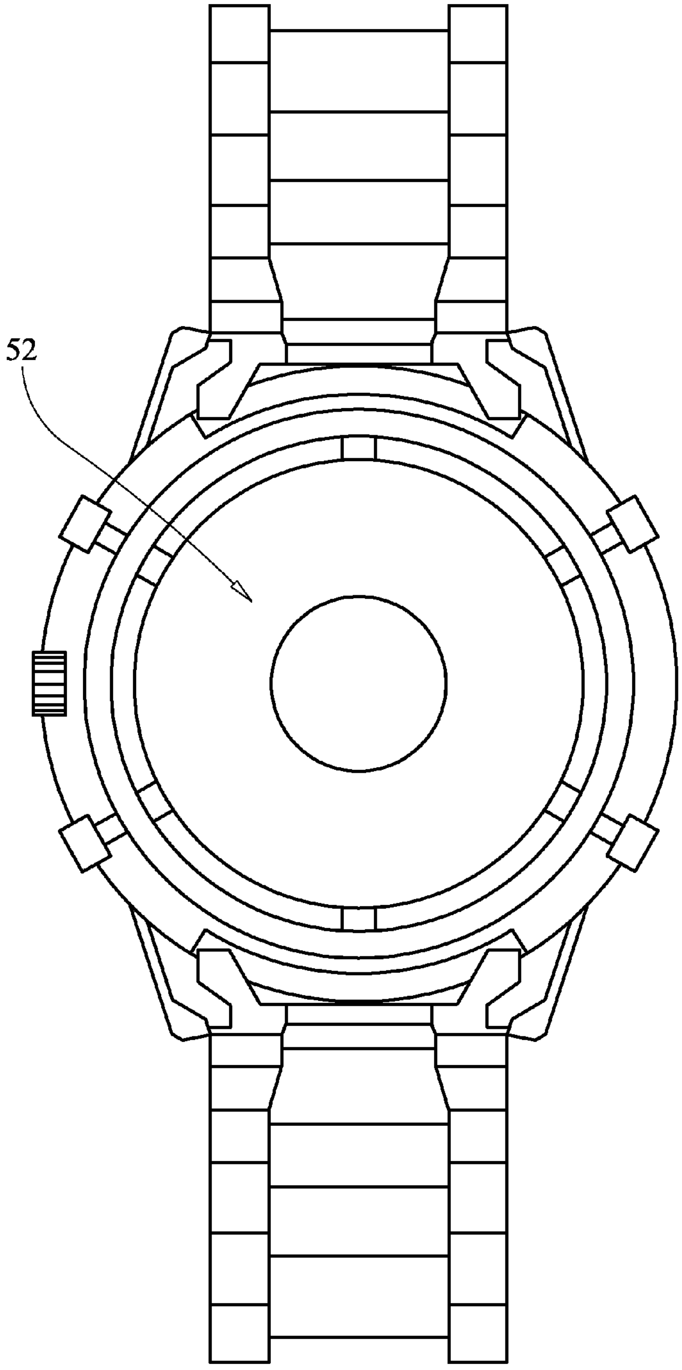
FIG. 11 depicts the present invention.

With reference to FIGS. 1A-11, a personal light apparatus is provided, the apparatus comprising: a resting base having a flat portion (8) and a battery compartment (5) for receiving a battery. The battery compartment (5) may open on the upper portion (100) of the flat portion or the lower portion (102) of the flat portion. There may be a light (3) having a flexible tube (1), the flexible tube (1) attached to the resting base (8). There may be a switch (4) in electrical communication with the battery (contained in battery compartment (5) and the light (3), wherein the switch (4) turns on and off the light (3) by allowing or not allowing electricity to flow from the battery. There may be at least one attachment means for removably attaching a time keeping apparatus (91) to the flat portion (8). The term removably is intended to denote that the time keeping apparatus is not permanently affixed to the flat portion. In providing an attachment means that is removably attached, the user may attach the apparatus to different time keeping devices of different sizes and shapes. According to one embodiment, the attachment means may have at least one hinged elbow (7); at least one flexible arm (9) in communication with the hinged elbow (7), wherein at least one flexible arm (9) is an outer flexible arm (9B). There may be at least one retaining bracket (6*a* and 6*b*) in communication with the outer flexible arm (9B) for retaining different sized time keeping apparatus. The attachment means may also be comprising at least one hinged elbow (7); at least one hinged arm (9) in communication with the hinged elbow (7), wherein at least one hinged arm (9) is an outer hinged arm (9B); and there may be at least one retaining bracket (6A and 6B) in communication with the outer hinged arm (9B) for retaining different sized time keeping apparatus. The term hinged refers to a jointed device or flexible piece on which an attached part turns, swings, or moves. Flexible, in contrast, refers to a part being capable of being bent without breaking, having some "give". The attachment means may be an adhesive layer (50) in communication with the flat portion (8) and the back (52) of the time keeping apparatus (as depicted in FIG. 11). When the product is being used, it may be worn either on the left wrist or the right wrist and the light in the stored position may be directed to the front (like a flashlight pointing ahead on the person walking). Or the beam of light may be directed perpendicular to the arm to assist in performing a task with the other hand. The light may be directed in any direction, because of the flexible tube (1). The flexible tube may be gooseneck metal tubing, which allows for easy, precise positioning of the light (3).

This is a very important aspect of the present invention, which provides a movable light and not a stationery light like much of the prior art. Also the present invention allows the light to be clipped on to the watch (time keeping device) and be adjusted to a variety of different sized watches, by having flexible arm and/or hinged elbow(s).

Figure 4:
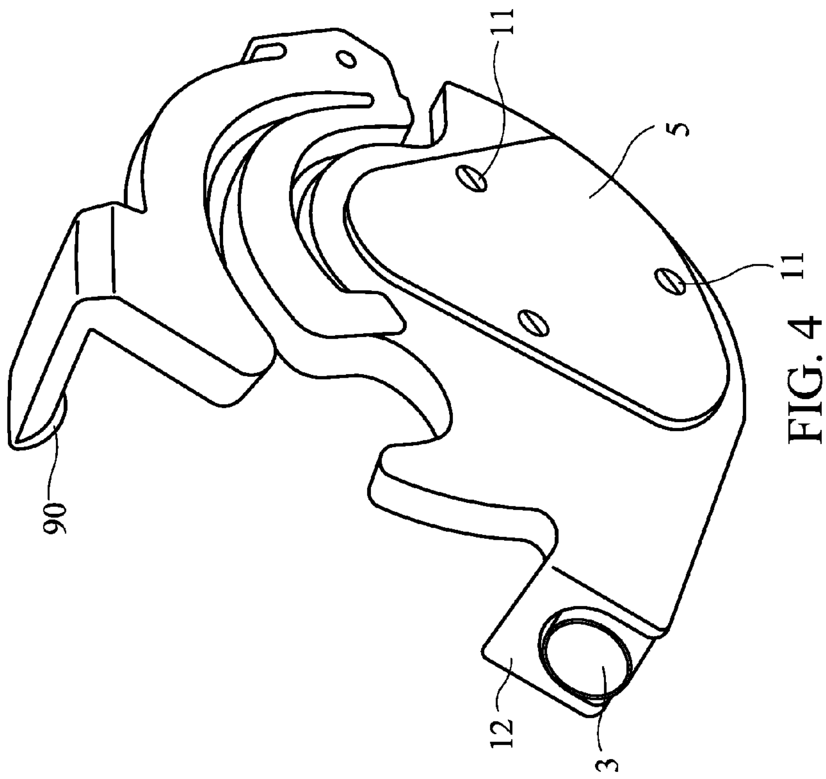
FIG. 4 depicts the present invention.
Figure 6:
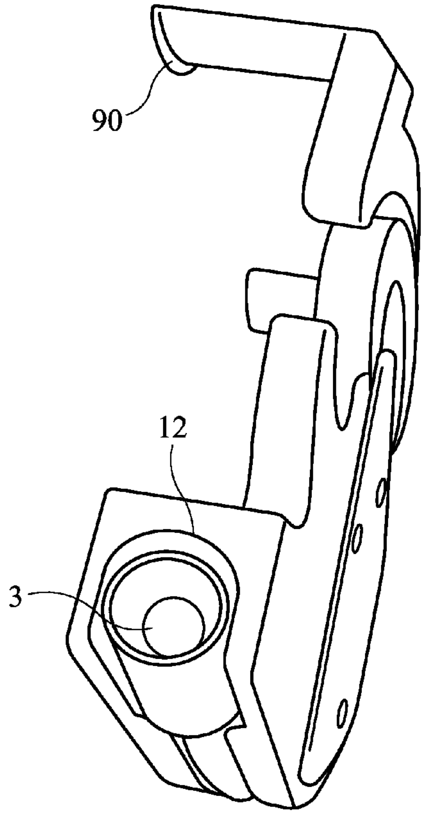
FIG. 6 depicts the present invention.
Figure 7:
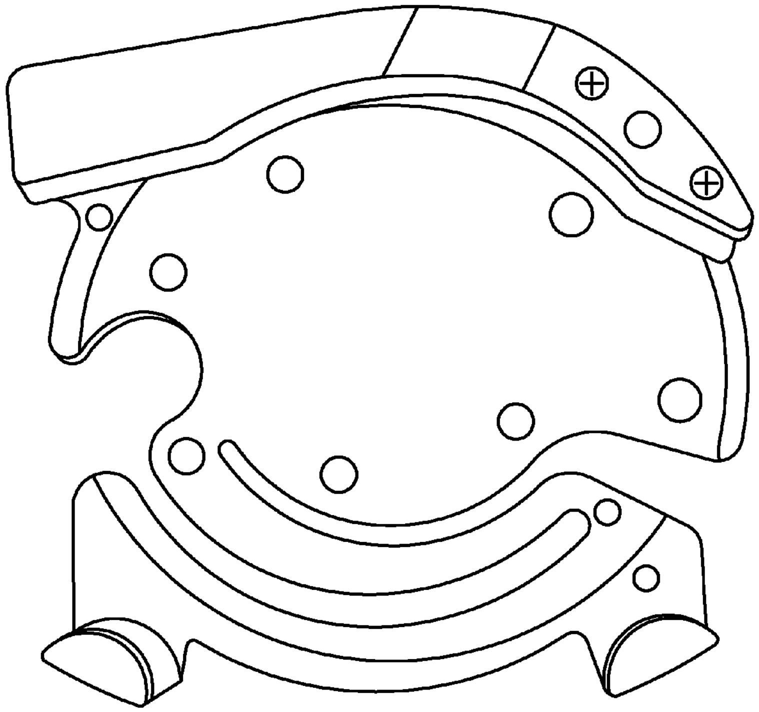
FIG. 7 depicts the present invention.
Figure 8:
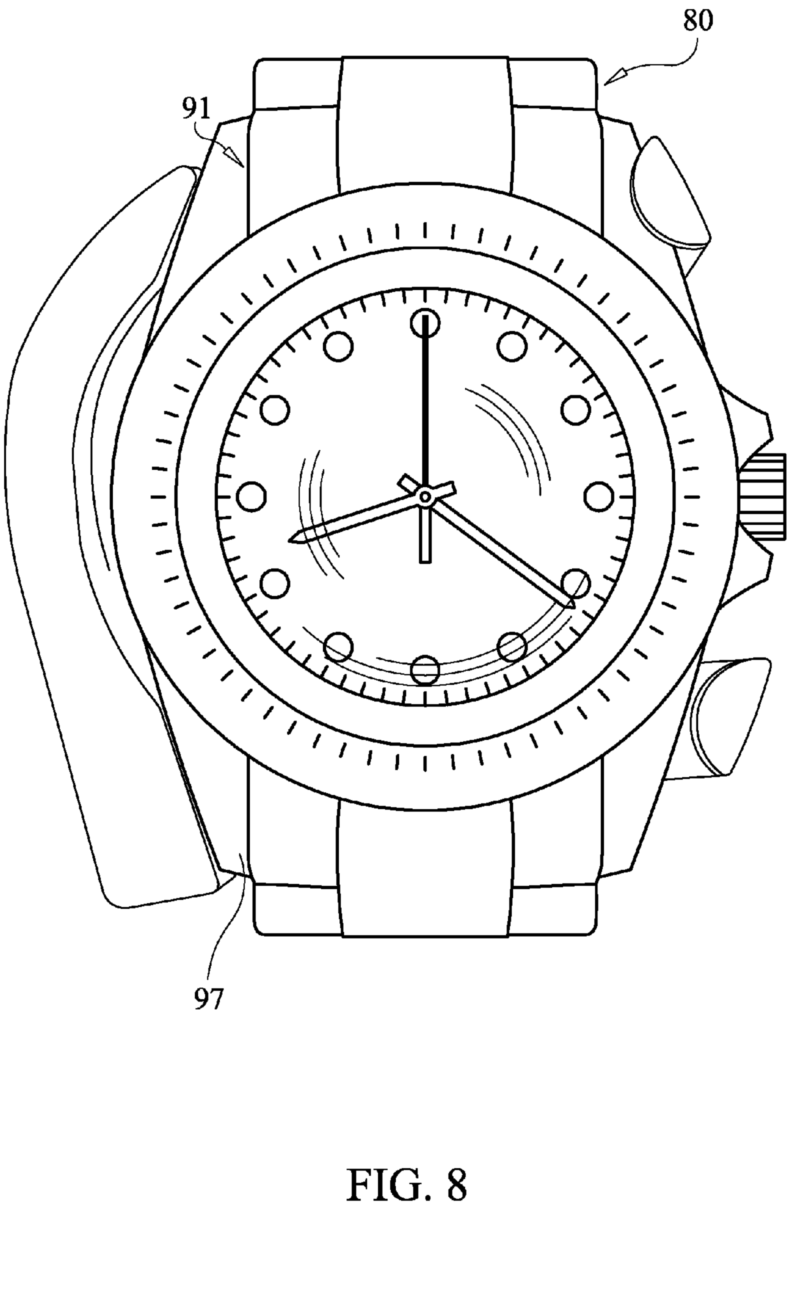
FIG. 8 depicts the present invention.
Figure 9:
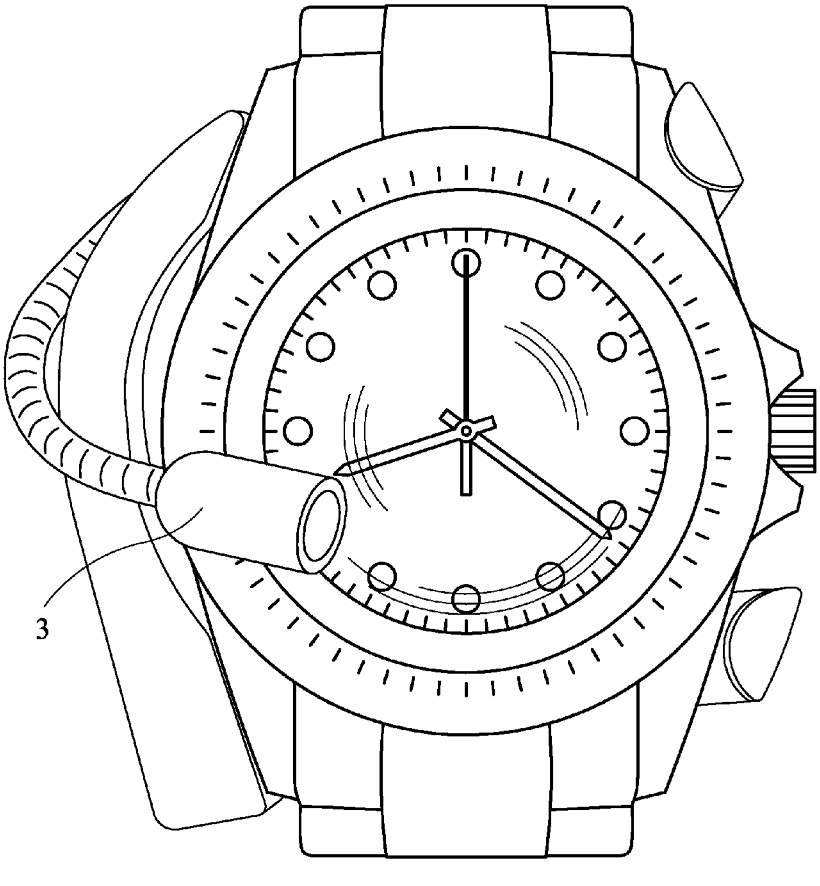
FIG. 9 depicts the present invention.
Figure 10:
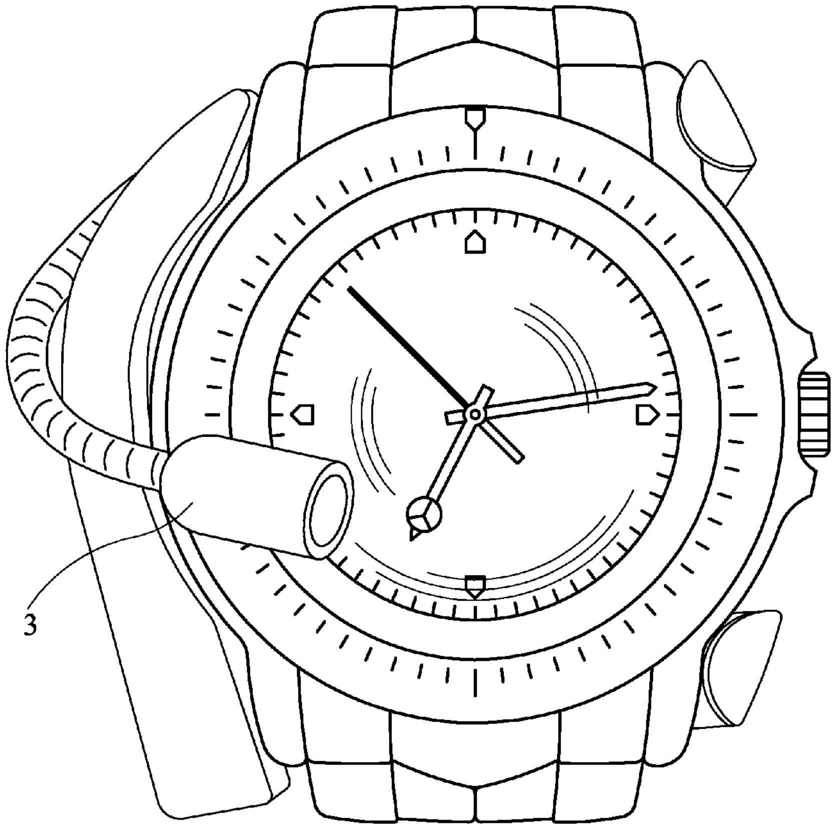
FIG. 10 depicts the present invention.

There may also be a retaining wall (10) having an opening (60) for receipt and storage of the light (3) having a flexible tube (1). The opening (60) may have a circular opening (12) in the front (93) of the retaining wall (10), which may allow illumination from the light (3) through the (12) opening when the light is in a stored position (See FIGS. 4 and 6, depicting the light (3) in the circular opening (12) in a stored position. The retaining wall may be substantially vertical along either a left side or right side of the resting base to allow the perimeter of the time keeping apparatus to retain the apparatus along the top (82) and bottom (84) of the resting base. The hinged elbow (7), flexible arm (9) and retaining bracket (6*a* and 6*b*) may be substantially vertical along either a left side or right side of the resting base to allow a bezel of the time keeping apparatus to retain the apparatus along the top (82) and bottom (84) of the resting base. The battery may be a coin cell battery and the battery compartment may be in at least a portion of the resting base (8). The retaining bracket may have a lip (90) on an end portion for retaining the time keeping apparatus along a top portion (97).

At least one of each of the resting base, the hinged elbow, the flexible arm and the retaining bracket may be made of Nylon having a modulus of elasticity between 1.2 and 3 $10^9$ N/$m^2$, GPa. This allows the resting base, hinged elbow, flexible arm and retaining bracket to have flexibility, without breaking. The resting base, the hinged elbow, the flexible arm and the retaining bracket may be made of any material, including plastics and polymer without departing from the scope of the present invention. According to a preferred embodiment, though, the resting base, the hinged elbow, the flexible arm and the retaining bracket should have be made of a material having material memory. The term "material memory" means the elasticity of the plastic allows it to be adjusted to the size of the watch helping it clip to a variety of watch sizes. The term flexible tube is intended to define the function of being flexible to move in any direction. This allows the light to move, for example, to the North, East, South and West when it is not being stored pointing South.

Figure 1B:
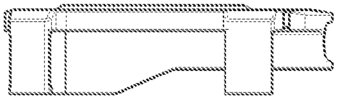
FIGS. 1A-1E depict the present invention.
Figure 1E:
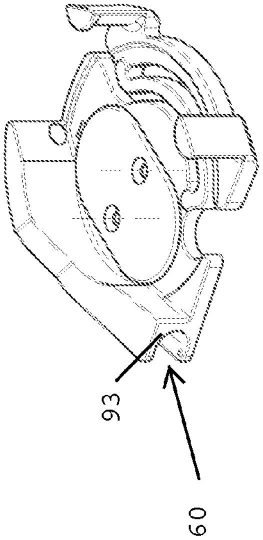
Figure 1A:
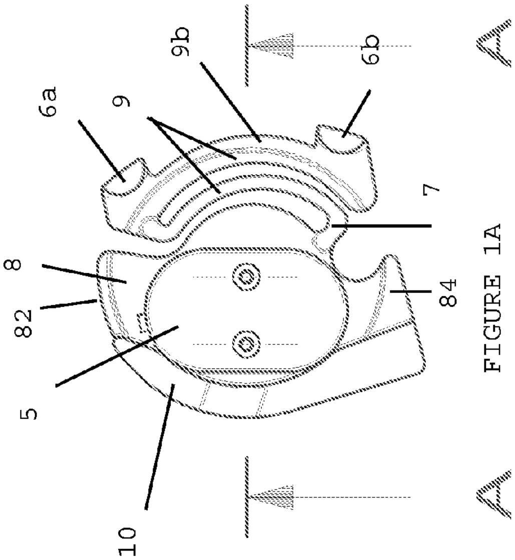
Figure 1C:
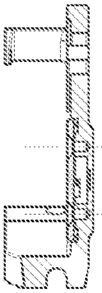
Figure 1D:
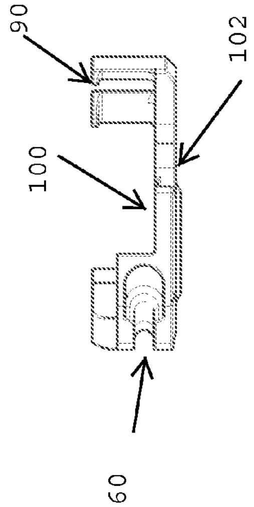
Figure 2A:
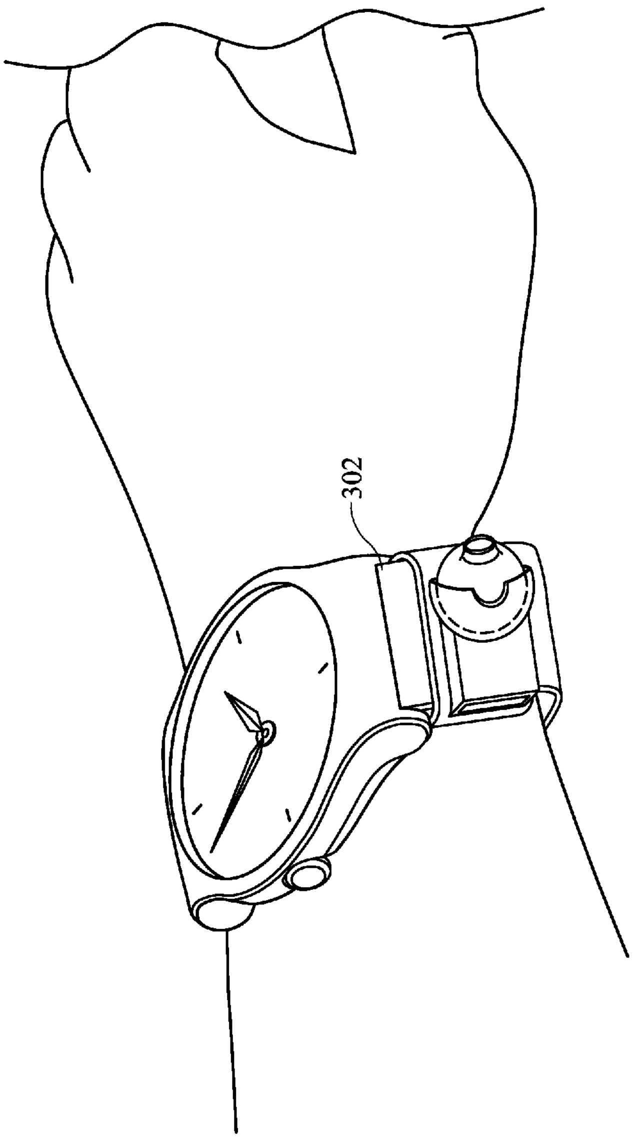
FIG. 2A-2B depict the present invention.
Figure 2B:
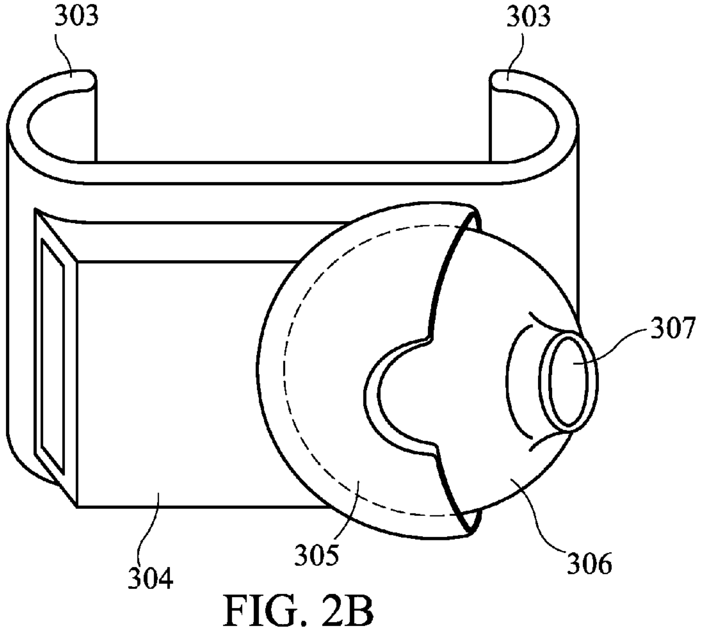

With reference to FIGS. 2A and 2B, an alternate embodiment is depicted, there is a watch (301), band (302), brackets or channel to hold to the watch band (303), battery compartment (304), ball joint for swivel light (outer part) (305), ball joint the light attached to this rotating part (inner part) (306) and LED light or bulb (307).

Figure 3:
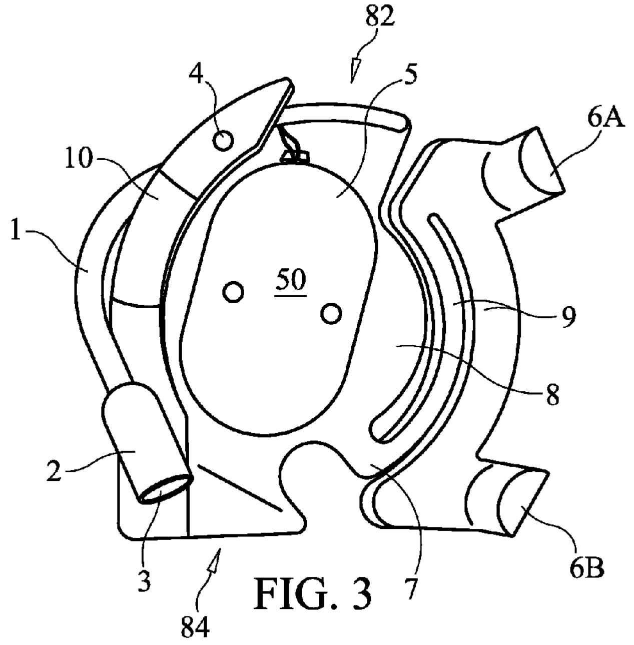
FIG. 3 depicts the present invention.
Figure 5:
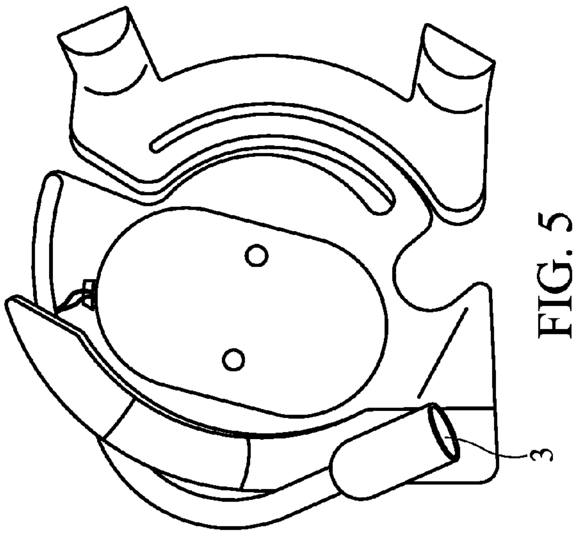
FIG. 5 depicts the present invention.

As shown in FIGS. 3 and 4, there is a Flexible tube to hold the LED light bulb (1), light cover to protect the LED light (2), or light bulb (3). There may be a switch (4), battery compartment cover (5), retaining bracket (6*a*), retaining bracket (6*b*), hinged elbow (7), resting base for the watch (8), flexible arms (9) that move to the right for larger diameter watch, retaining wall (10) to hold the watch on the left side, screws (11) to hold the battery compartment cover, U shaped channel to store LED light (bulb), light cover and flexible tube (12). The retaining bracket (6*a*), retaining bracket (6*b*), hinged elbow (7), resting base (8), flexible arms (9) and retaining wall (10) may be flexible and can stretch to accommodate most round watches including those from 38 mm to 47 mm diameter.

The present invention has been described in relation to particular examples, which are intended to be illustrative rather than restrictive, with the scope and spirit of the invention being indicated by the following claims and their equivalents.

I claim:

1. A personal light apparatus, said apparatus comprising:
- a resting base having a flat portion and a battery compartment for receiving a battery;
- a light having a flexible tube, said flexible tube attached to said resting base;
- a switch in electrical communication with said battery and said light, wherein said switch turns on and off said light;
- at least one attachment means for removably attaching a time keeping apparatus to said flat portion.

2. An apparatus as in claim 1, said attachment means comprising:
- at least one hinged elbow;
- at least one flexible arm in communication with said hinged elbow, wherein at least one flexible arm is an outer flexible arm;
- at least one retaining bracket in communication with said outer flexible arm for retaining different sized time keeping apparatus.

3. An apparatus as in claim 1, said attachment means comprising:
- at least one hinged elbow;
- at least one hinged arm in communication with said hinged elbow, wherein at least one hinged arm is an outer hinged arm;
- at least one retaining bracket in communication with said outer hinged arm for retaining different sized time keeping apparatus.

4. An apparatus as in claim 1, said attachment means comprising:
- an adhesive layer in communication with said flat portion and the back of said time keeping apparatus.

5. An apparatus as in claim 1, further comprising:
- a retaining wall having an opening for receipt and storage of said light having a flexible tube.

6. An apparatus as in claim 5, further comprising:
- an opening in a front portion of said retaining wall, to allow illumination from said light through said opening when said light is in a stored position.

7. An apparatus as in claim 4, wherein said retaining wall is substantially vertical along either a left side or right side of said resting base to allow a perimeter of said time keeping apparatus to retain said apparatus along the top and bottom of said resting base.

8. An apparatus as in claim 2, wherein said hinged elbow, flexible arm and said retaining bracket are substantially vertical along either a left side or right side of said resting base to allow a perimeter of said time keeping apparatus to retain said apparatus along the top and bottom of said resting base.

9. An apparatus as in claim 1, wherein said battery is a coin cell battery and said battery compartment is in at least a portion of said resting base.

10. An apparatus as in claim 2, wherein east said retaining bracket has a lip on an end portion for retaining said time keeping apparatus along a top portion.

11. An apparatus as in claim 2, wherein at least one of each said resting base, said hinged elbow, said flexible arm and retaining bracket are made of Nylon having a modulus of elasticity between 1.2 and 3 $10^9$ N/$m^2$, GPa.

12. A personal light apparatus, said apparatus comprising:

a resting base having a flat portion and a battery compartment for receiving a battery;

a light having a flexible tube, said flexible tube attached to said resting base;

a switch in electrical communication with said battery and said light, wherein said switch turns on and off said light;

at least one hinged elbow;

at least one flexible arm in communication with said hinged elbow, wherein at least one flexible arm is an outer flexible arm;

at least one retaining bracket in communication with said outer flexible arm for removably attaching and retaining different sized time keeping apparatus to said flat portion.

13. An apparatus as in claim 10, said attachment means comprising:

an adhesive layer in communication with said flat portion and the back of said time keeping apparatus.

14. An apparatus as in claim 10, further comprising:

A retaining wall having an opening for receipt and storage of said light having a flexible tube.

15. An apparatus as in claim 12, wherein said retaining wall is substantially vertical along either a left side or right side of said resting base to allow a perimeter of said time keeping apparatus to retain said apparatus along the top and bottom of said resting base.

16. An apparatus as in claim 10, wherein said hinged elbow, flexible arm and said retaining bracket are substantially vertical along either a left side or right side of said resting base to allow a perimeter of said time keeping apparatus to retain said apparatus along the top and bottom of said resting base.

17. An apparatus as in claim 10, wherein said battery is a coin cell battery and said battery compartment is in at least a portion of said resting base.

18. An apparatus as in claim 10, wherein east said retaining bracket has a lip on an end portion for retaining said time keeping apparatus along a top portion.

19. An apparatus as in claim 14 further comprising:

an opening in a front portion of said retaining wall, to allow illumination from said light through said opening when said light is in a stored position.

20. An apparatus as in claim 12, wherein at least one of each said resting base, said hinged elbow, said flexible arm and retaining bracket are made of Nylon having a modulus of elasticity between 1.2 and 3 $10^9$ $N/m^2$, GPa.

* * * * *